(12) United States Patent
Wu

(10) Patent No.: US 6,425,319 B1
(45) Date of Patent: Jul. 30, 2002

(54) GRILLER WITH PRESETTABLE COOKING TEMPERATURE AND TIMED ALARM CAPABILITY

(75) Inventor: Tsan-Kuen Wu, Tainan Hsien (TW)

(73) Assignee: Tsann Kuen USA Inc., Pasadena, CA (US)

( * ) Notice: Subject to any disclaimer, the term of this patent is extended or adjusted under 35 U.S.C. 154(b) by 0 days.

(21) Appl. No.: 10/027,109

(22) Filed: Dec. 20, 2001

(51) Int. Cl.⁷ .............................................. A23L 27/00
(52) U.S. Cl. ...................................................... 99/332
(58) Field of Search ........................... 99/326–333, 337, 99/338, 339, 340, 342–344, 372–380, 400, 401, 444–450, 482; 219/386, 400, 521, 492, 494, 497

(56) References Cited

U.S. PATENT DOCUMENTS

| | | | | |
|---|---|---|---|---|
| 3,880,064 A | * | 4/1975 | Martinex | 99/349 |
| 4,972,766 A | * | 11/1990 | Anetsberger | 99/332 |
| 5,473,976 A | * | 12/1995 | Hermansson | 99/349 |
| 5,531,155 A | * | 7/1996 | Pellicane et al. | 99/372 |
| 5,555,794 A | * | 9/1996 | Templeton et al. | 99/349 |
| 5,655,434 A | * | 8/1997 | Liebemann | 99/353 |
| 5,676,046 A | * | 10/1997 | Taber et al. | 99/340 |
| 5,755,150 A | * | 5/1998 | Matsumoto et al. | 99/372 |
| 5,771,782 A | * | 6/1998 | Taber et al. | 99/385 X |
| 5,802,958 A | * | 9/1998 | Hermansson | 99/379 X |
| 5,839,359 A | * | 11/1998 | Gardener | 99/349 |
| 5,881,634 A | * | 3/1999 | Newton | 99/379 X |
| 5,890,419 A | * | 4/1999 | Moravec | 99/349 |

\* cited by examiner

*Primary Examiner*—Timothy F. Simone
(74) *Attorney, Agent, or Firm*—Harness, Dickey & Pierce, P.L.C.

(57) ABSTRACT

A griller includes a control circuit for controlling heating operation of an electric heater unit. The control circuit includes a heater controller for controlling supply of electric power to the electric heater unit, a sensor unit for detecting cooking temperature in a cooking space of the griller and for generating a sensor output corresponding to the detected cooking temperature, a user input unit for providing a cooking temperature setting and a cooking time setting, a processor unit for controlling operation of the heater controller in accordance with the sensor output and the cooking temperature setting, and for generating an alarm activate signal upon detection that a predetermined time period corresponding to the cooking time setting has elapsed since the start of the supply of the electric power to the electric heater unit, and an alarm unit activated by the alarm activate signal for generating an alarm output.

12 Claims, 4 Drawing Sheets

GRILLER WITH PRESETTABLE COOKING TEMPERATURE AND TIMED ALARM CAPABILITY

BACKGROUND OF THE INVENTION

1. Field of the Invention

The invention relates to a griller, more particularly to a griller that permits setting of both the cooking temperature and the cooking time.

2. Description of the Related Art

A conventional steak griller has a pair of cooking grill members that are configured to confine a cooking space for receiving a piece of steak therein when the cooking grill members are closed together. When electric power is supplied to electric heaters of the cooking grill members, the temperature in the cooking space will rise to a preset cooking temperature and will be maintained thereat for cooking the steak piece.

A main drawback of the aforesaid conventional steak griller resides in that the user has to monitor the cooking time so that the steak piece can be cooked as desired.

SUMMARY OF THE INVENTION

Therefore, the main object of the present invention is to provide a griller that permits setting of both the cooking temperature and the cooking time so as to overcome the aforesaid drawback of the prior art.

According to the present invention, a griller comprises upper and lower cooking grill members, an electric heater unit, and a control circuit.

The upper and lower cooking grill members are coupled to each other and are configured to confine a cooking space when closed together. The cooking space is adapted to receive a piece of steak therein.

The electric heater unit is associated with the upper and lower cooking grill members and is operable so as to heat and cook the piece of steak in the cooking space.

The control circuit is connected to the electric heater unit and controls heating operation of the electric heater unit. The control circuit includes a heater controller, a sensor unit, a user input unit, a processor unit, and an alarm unit.

The heater controller is connected to the electric heater unit and is adapted to be connected to a power supply. The heater controller is operable so as control supply of electric power to the electric heater unit.

The sensor unit is adapted to detect cooking temperature in the cooking space and to generate a sensor output corresponding to the cooking temperature detected thereby.

The user input unit is operable so as to provide a cooking temperature setting and a cooking time setting.

The processor unit is connected to the heater controller, the sensor unit and the user input unit. The processor unit controls operation of the heater controller in accordance with the sensor output from the sensor unit and the cooking temperature setting from the user input unit, and generates an alarm activate signal upon detection by the processor unit that a predetermined time period corresponding to the cooking time setting from the user input unit has elapsed since the start of the supply of the electric power to the electric heater unit.

The alarm unit is connected to the processor unit and is activated by the alarm activate signal for generating an alarm output.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
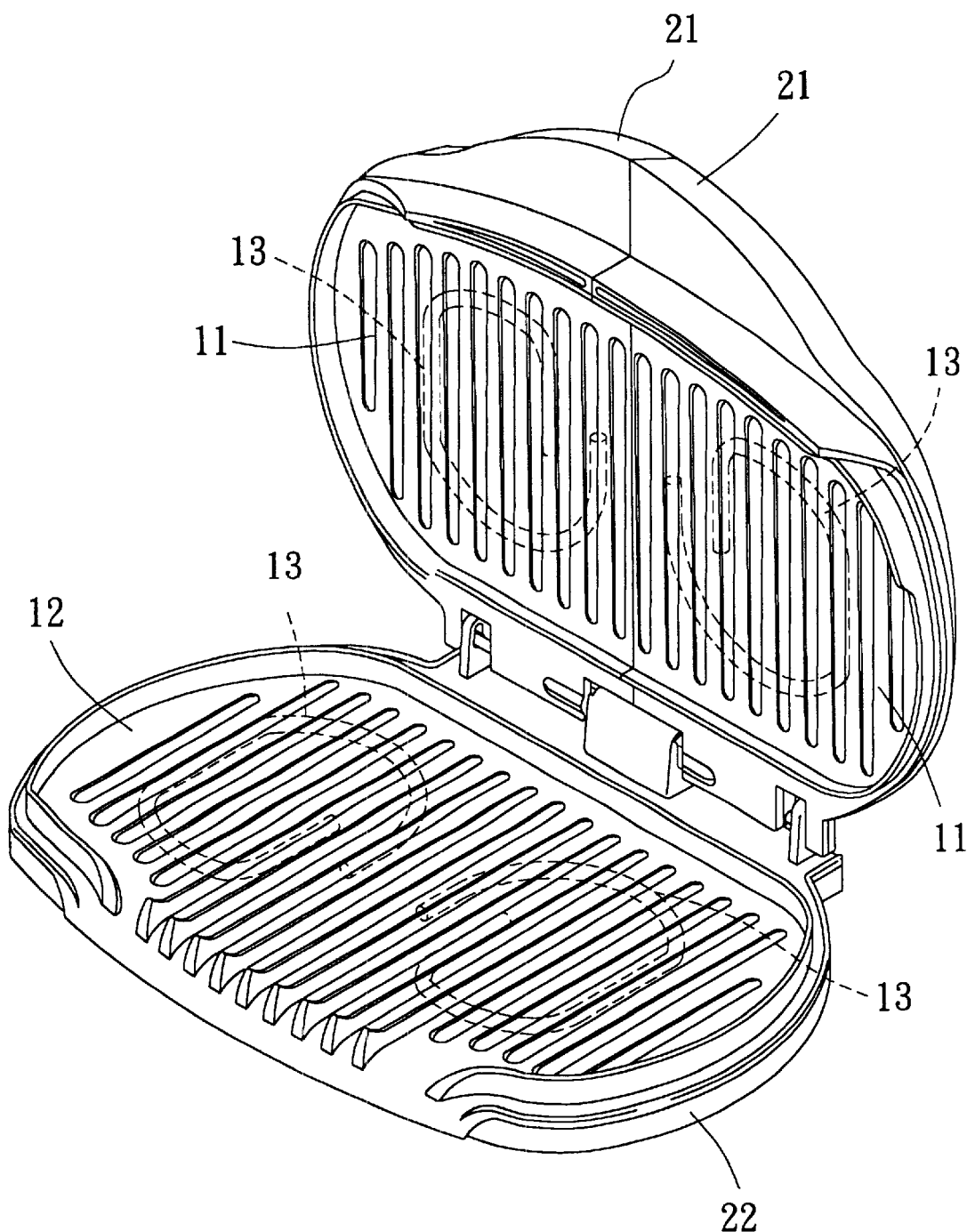
FIG. 1 is a perspective view to illustrate the preferred embodiment of a griller according to the present invention in an opened state.
Figure 2:
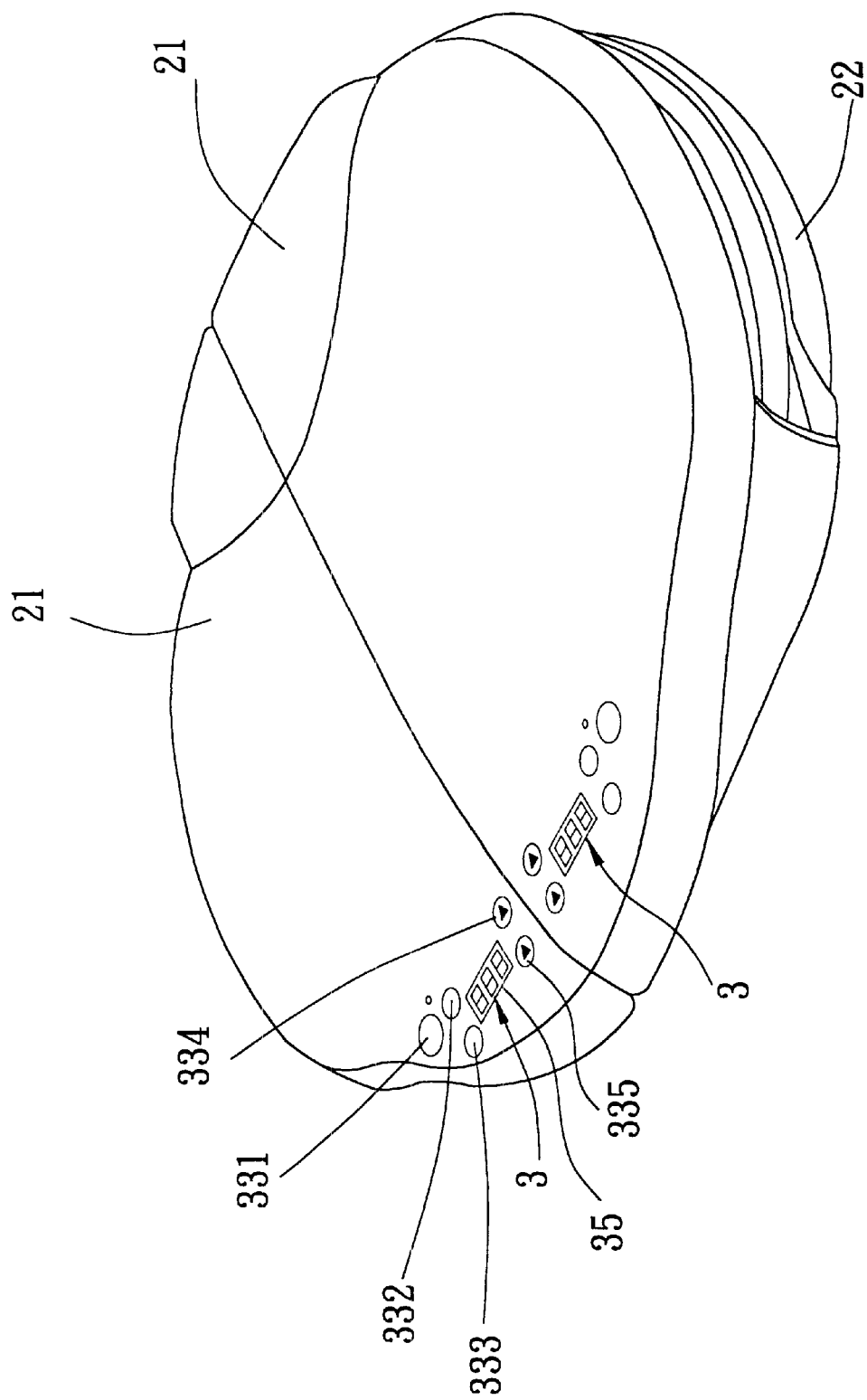
FIG. 2 is another perspective view to illustrate the preferred embodiment in a closed state.

Referring to FIGS. 1 and 2, the preferred embodiment of a griller according to the present invention is shown to comprise a lower cooking grill member 12 and a pair of upper cooking grill members 11 having rear ends coupled pivotally to the lower cooking grill member 12. Each upper cooking grill member 11 is configured to confine a cooking space with the lower cooking grill member 12 when the upper and lower cooking grill members 11, 12 are closed together. The cooking space is adapted to receive a piece of steak therein. Each of the upper cooking grill members 11 is associated with a respective electric heater 13. The lower cooking grill member 12 is associated with a pair of electric heaters 13 in view of its larger size. The electric heaters 13 of the lower cooking grill member 12 correspond respectively to the electric heaters 13 of the upper cooking grill members 11. As such, when electric power is supplied to an associated pair of the electric heaters 13 of the upper and lower cooking grill members 11, 12, one of the cooking spaces will be heated for cooking the piece of steak therein. It should be noted that the aforesaid arrangement of the upper and lower cooking grill members 11, 12 and the electric heaters 13 is only to illustrate the present invention, and that the present invention should not be limited thereto. The present invention is also applicable to a griller having a single upper cooking grill member, a single lower cooking grill member, and a single electric heater in each of the upper and lower cooking grill members.

In this embodiment, each of the upper and lower cooking grill members 11, 12 is further provided with a housing 21, 22 at an outer side thereof. Each of a pair of control circuits 3 is mounted in the housing 21 of a respective one of the upper cooking grill members 11, and is used to control the heating operation of an associated pair of the electric heaters 13 of the upper and lower cooking grill members 11, 12. Each associated pair of the electric heaters 13 constitutes an electric heater unit.

Figure 3:
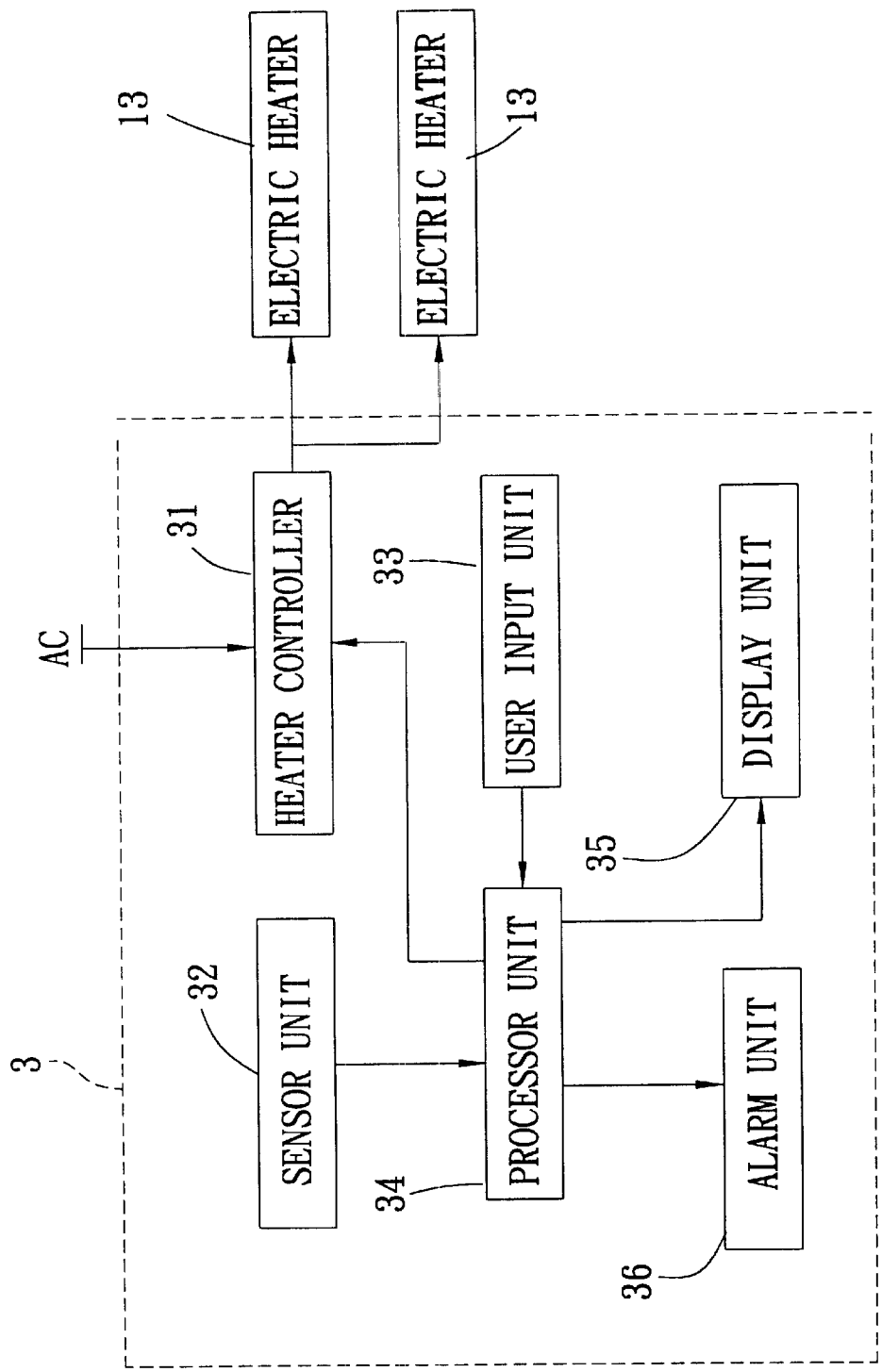
FIG. 3 is a schematic circuit block diagram illustrating a control circuit of the preferred embodiment.
Figure 4:
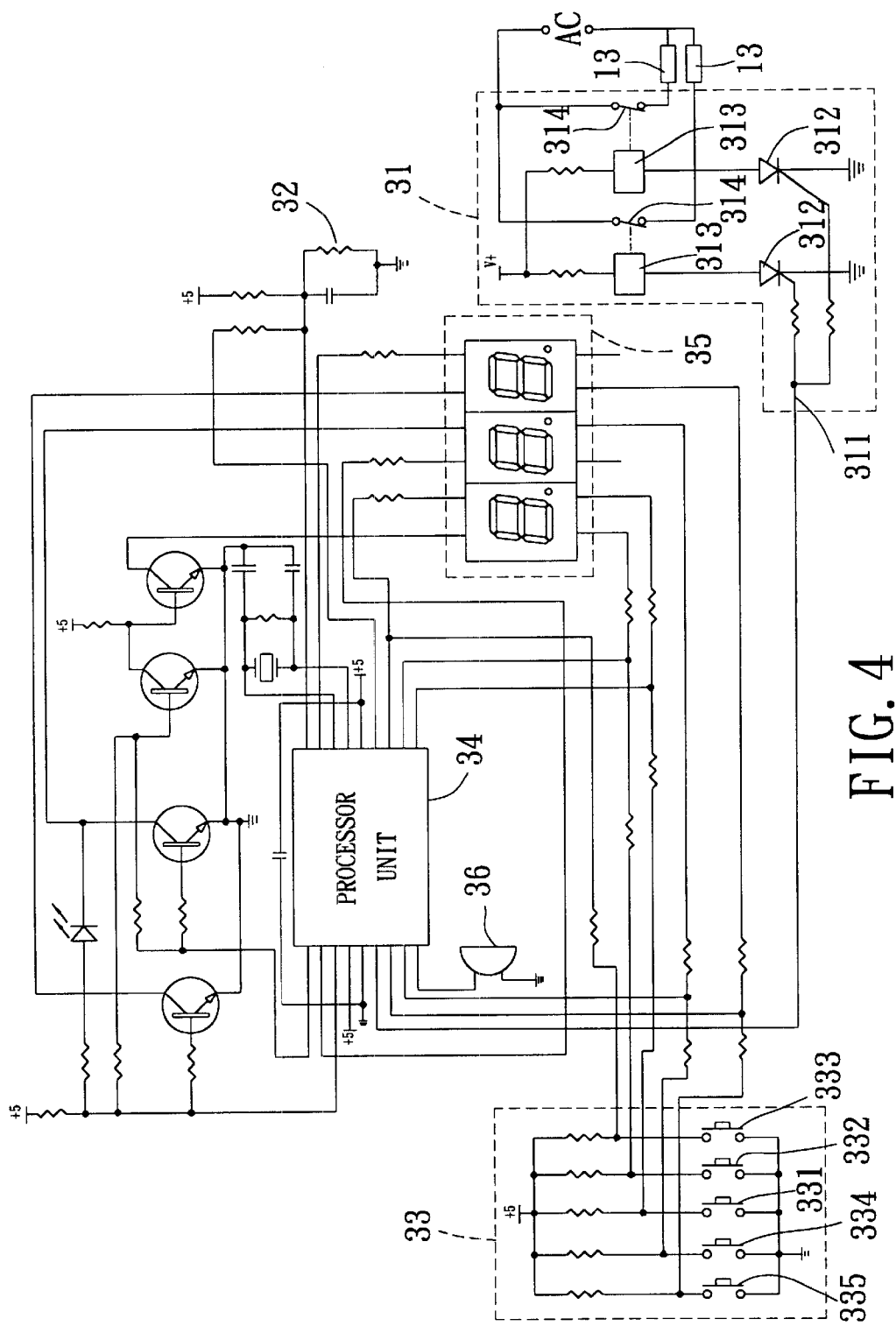
FIG. 4 is a schematic electrical circuit diagram of the control circuit of FIG. 3.

With further reference to FIGS. 3 and 4, each control circuit 3 includes a heater controller 31 connected to the electric heaters 13 and operable so as to control the supply of an alternating current (AC) voltage from an AC power source to the electric heaters 13, a sensor unit 32 for generating a sensor output corresponding to the cooking temperature in the cooking space, a user input unit 33 which is manually operable so as to provide a cooking temperature setting and a cooking time setting, a processor unit 34 which is connected to the heater controller 31, the sensor unit 32 and the user input unit 33, and which controls operation of the heater controller 31 in accordance with the sensor output from the sensor unit 32 and the cooking temperature setting from the user input unit 33, a display unit 35 connected to and controlled by the processor unit 34 so as to provide a visual indication of the cooking temperature and cooking time settings, and an alarm unit 36 connected to and controlled by the processor unit 34 to generate an alarm output.

The heater controller 31 has a control input 311 connected to the processor unit 34, and includes a pair of thyristors 312, in the form of silicon-controlled rectifiers (SCR), and a pair of relays 313, each of which is connected in series with a respective one of the thyristors 312. When the gate terminals of the thyristors 312 receive a low logic input from the processor unit 34 via the control input 311, the thyristors 312 will remain in a non-conducting state such that electric current will be unable to flow through the relays 313. The relays 313 are de-energized, and a normally closed switch 314 of each relay 313 connects a respective one of the electric heaters 13 to the AC power source at this time. Accordingly, when the gate terminals of the thyristors 312 receive a high logic input from the processor unit 34 via the control input 311, the thyristors 312 will conduct such that electric current will be able to flow through the relays 313. The relays 313 are energized, and the normally closed switches 314 of the relays 313 disconnect the electric heaters 13 from the AC power source.

The sensor unit 32 is disposed in either one of the upper and lower cooking grill members 11, 12 so as to detect the cooking temperature in the cooking space. The sensor output of the sensor unit 32 is provided to the processor unit 34. In this embodiment, the sensor unit 32 is disposed in the housing 21 of one of the upper cooking grill members 11, and is in the form of a negative temperature coefficient (NTC) thermistor.

The user input unit 33 includes a set of push button keys mounted on the housing 21 of one of the upper cooking grill members 11. The push button keys include a power control key 331, a temperature setting key 332, a time setting key 333, and up-and-down adjust keys 334, 335. The power control key 331 is operated to control activation and deactivation of the control circuit 3. The temperature setting key 332 is operated when it is desired to set the cooking temperature. After operating the temperature setting key 332, the adjust keys 334, 335 can be operated to increase or decrease the cooking temperature setting. The time setting key 333 is operated when it is desired to set the cooking time. After operating the time setting key 333, the adjust keys 334, 335 can be operated to increase or decrease the cooking time setting.

The processor unit 34 is programmed to compare the sensor output from the sensor unit 32 with the cooking temperature setting from the user input unit 33, and controls operation of the heater controller 31 in accordance with the result of the comparison so that the cooking temperature can be controlled to reach the cooking temperature setting. Simultaneous with the connection of the electric heaters 13 to the AC power source, the processor unit 34 further operates in a timer mode, wherein the processor unit 34 generates an alarm activate signal upon detection by the processor unit 34 that a predetermined time period corresponding to the cooking time setting from the user input unit 33 has elapsed since the start of the supply of the electric power to the electric heaters 13.

The display unit 35 is mounted on the housing 21 of one of the upper cooking grill members 11. In this embodiment, the display unit 35 includes three seven-segment light emitting diode (LED) displays that are controlled by the processor unit 34 so as to provide a visual indication of the cooking temperature setting and the cooking time setting. Particularly, the display unit 35 provides a visual indication of the cooking temperature setting when setting the cooking temperature, and provides a visual indication of the cooking time setting when setting the cooking time.

In the preferred embodiment, the alarm unit 36 includes a buzzer and is activated by the alarm activate signal from the processor unit 34 to generate an audible alarm output for alerting the user when the predetermined time period corresponding to the cooking time setting has elapsed.

The operation of the preferred embodiment will now be described in the following paragraphs.

Initially, when the griller is connected to the AC power supply and the power control key 331 is yet to be operated to activate the control circuit 3, the display unit 35 is controlled by the processor unit 34 to show three dashes thereon, thereby indicating that the cooking temperature setting and the cooking time setting have not yet been inputted and that the electric heaters 13 are in a non-operative state.

After operating the power control key 331, the control circuit 3 automatically operates in a cooking time setting mode. At this time, the display unit 35 is controlled by the processor unit 34 to show a default value "5", corresponding to a default cooking time setting of 5 minutes, and the heater controller 31 is controlled by the processor unit 34 to permit the supply of the electric power to the electric heaters 13. By operating the adjust keys 334, 335, the cooking time setting can be increased or decreased as desired. The value shown on the display unit 35 is adjusted as well to reflect the current cooking time setting. In this embodiment, the cooking time setting can be adjusted within the range of 1 to 20 minutes.

Thereafter, when the temperature setting key 332 is operated, the control circuit 3 will operate in a cooking temperature setting mode. At this time, the display unit 35 is controlled by the processor unit 34 to show a default value "300", corresponding to a default cooking temperature setting of 300° C. By operating the adjust keys 334, 335, the cooking temperature setting can be increased or decreased in units of twenty as desired. In this embodiment, the cooking temperature setting can be adjusted within the range of 300 to 400° C.

When neither the cooking time setting nor the cooking temperature setting is adjusted after operating the power control key 331, simultaneous with the start of the supply of the electric power to the electric heaters 13, the processor unit 34 will operate in the timer mode. Operation of the time setting key 333 at this time will enable the processor unit 34 to control the display unit 35 for showing the remaining cooking time thereon. At the end of the time period corresponding to the cooking time setting, the processor unit 34 generates the alarm activate signal for activating the alarm unit 36, thereby alerting the user.

When electric power is supplied to the electric heaters 13, the cooking temperature in the cooking space will gradually rise to the cooking temperature setting, such as 300° C. Operation of the time setting key 333 at this time will enable the processor unit 34 to control the display unit 35 to flash the value "300" thereon as long as the cooking temperature in the cooking space has not yet reached 300° C. Upon detection that the cooking temperature in the cooking space has reached 300° C., the processor unit 34 will control the display unit 35 to continuously show the value "300" thereon, and will further control the heater controller 31 to interrupt the supply of the electric power to the electric heaters 13. In this way, the cooking temperature can be ensured to reach the vicinity of 300° C., preferably 300±5° C.

It is worthwhile to note that, during operation of the processor unit 34 in the timer mode, after operating a selected one of the temperature setting key 332 and the time setting key 333 in combination with the adjust keys 334, 335, the cooking temperature setting and the cooking time setting can be adjusted as desired.

Whether or not a steak piece is properly cooked depends on both the cooking temperature and the cooking time. Different cooking temperatures have different cooking time requirements. In the present invention, due to the provision of the control circuit 3, both the cooking temperature and the cooking time can be set beforehand by the user. Upon cooking a steak piece for a time period corresponding to the cooking time setting, an alarm output will be generated by the griller of this invention to alert the user. As such, steak pieces can be cooked as desired without the need for the user to monitor the grilling operation. Preferably, a look-up table of cooking temperatures and their recommended cooking times is attached to the griller to facilitate selection of the cooking temperature and cooking time settings by the user.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A griller comprising:

upper and lower cooking grill members coupled to each other and configured to confine a cooking space when closed together, said cooking space being adapted to receive a piece of steak therein;

an electric heater unit associated with said upper and lower cooking grill members and operable so as to heat and cook the piece of steak in said cooking space; and a control circuit connected to said electric heater unit for controlling heating operation of said electric heater unit, said control circuit including a heater controller connected to said electric heater unit and adapted to be connected to a power supply, said heater controller being operable so as control supply of electric power to said electric heater unit, a sensor unit adapted to detect cooking temperature in said cooking space and to generate a sensor output corresponding to the cooking temperature detected thereby, a user input unit operable so as to provide a cooking temperature setting and a cooking time setting, a processor unit connected to said heater controller, said sensor unit and said user input unit, said processor unit controlling operation of said heater controller in accordance with the sensor output from said sensor unit and the cooking temperature setting from said user input unit, and generating an alarm activate signal upon detection by said processor unit that a predetermined time period corresponding to the cooking time setting from said user input unit has elapsed since the start of the supply of the electric power to said electric heater unit, and an alarm unit connected to said processor unit and activated by the alarm activate signal for generating an alarm output.

2. The griller as claimed in claim 1, wherein said sensor unit includes a negative temperature coefficient thermistor.

3. The griller as claimed in claim 1, wherein said alarm unit includes a buzzer.

4. The griller as claimed in claim 1, wherein said processor unit compares the sensor output with the cooking temperature setting, and controls said heater controller to control in turn the supply of the electric power to said electric heater unit such that the cooking temperature in said cooking space can be controlled to reach the cooking temperature setting.

5. The griller as claimed in claim 4, wherein said processor unit controls said heater controller to supply the electric power to said electric heater unit when the cooking temperature in said cooking space has yet to reach the cooking temperature setting, and to interrupt the supply of the electric power to said electric heater unit when the cooking temperature in said cooking space has reached the cooking temperature setting.

6. The griller as claimed in claim 1, wherein said user input unit includes a power control key for controlling activation and deactivation of said control circuit.

7. The griller as claimed in claim 1, wherein said user input unit includes a temperature setting key, a time setting key and at least one adjust key, said temperature setting key being operable in combination with said adjust key to provide the cooking temperature setting, said time setting key being operable in combination with said adjust key to provide the cooking time setting.

8. The griller as claimed in claim 7, wherein said control circuit further includes a display unit connected to and controlled by said processor unit so as to provide a visual indication of the cooking temperature setting and the cooking time setting.

9. The griller as claimed in claim 8, wherein said temperature setting key is operable so as to enable operation of said processor unit in a cooking temperature setting mode, where the cooking temperature setting can be adjusted by operating said adjust key and where the cooking temperature setting is shown on said display unit, said time setting key being operable so as to enable operation of said processor unit in a cooking time setting mode, where the cooking time setting can be adjusted by operating said adjust key and where the cooking time setting is shown on said display unit.

10. The griller as claimed in claim 1, wherein said control circuit further includes a display unit connected to and controlled by said processor unit so as to provide a visual indication of the cooking temperature setting and the cooking time setting.

11. The griller as claimed in claim 10, wherein said processor unit is operable so as to control said display unit to flash the cooking temperature setting thereon upon detection by said processor unit that the cooking temperature in said cooking space has yet to reach the cooking temperature setting, and to show the cooking temperature setting continuously thereon upon detection by said processor unit that the cooking temperature in said cooking space has reached the cooking temperature setting.

12. The griller as claimed in claim 10, wherein said processor unit is operable so as to control said display unit to show remaining cooking time thereon.

* * * * *